United States Patent
Sedlar et al.

(10) Patent No.: US 7,631,630 B2
(45) Date of Patent: Dec. 15, 2009

(54) VEHICLE ENGINE AND SNAP-ON ENGINE COVER ASSEMBLY THEREFOR AND METHOD OF ASSEMBLY OF THE COVER ASSEMBLY TO THE ENGINE

(75) Inventors: Brent Ryan Sedlar, Ann Arbor, MI (US); Edward Lesnau, IV, Livonia, MI (US); Philip Kinney, Ortonville, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 11/970,440

(22) Filed: Jan. 7, 2008

(65) Prior Publication Data
US 2009/0173310 A1    Jul. 9, 2009

(51) Int. Cl.
    *F02B 77/00*    (2006.01)
(52) U.S. Cl. .............. 123/195 C; 123/90.38; 220/324; 220/326
(58) Field of Classification Search .............. 123/90.38, 123/195 C, 198 E; 220/324, 326, 683–686, 220/315, 319, 322, 378
See application file for complete search history.

(56) References Cited

U.S. PATENT DOCUMENTS

| | | | |
|---|---|---|---|
| 2,053,297 A | 9/1936 | Nittel | |
| 2,724,378 A | 11/1955 | Wellman | |
| 2,837,063 A | 6/1958 | Martinez | |
| 3,396,712 A | 8/1968 | Sakraida et al. | |
| 3,678,914 A | 7/1972 | Vulliamy | |
| 4,619,343 A | 10/1986 | Lengenfelder | |
| 4,677,947 A | 7/1987 | Bousquet | |
| 4,682,672 A | 7/1987 | Berger et al. | |
| 4,709,670 A | 12/1987 | Ampferer | |
| 4,788,950 A | 12/1988 | Finley | |
| 5,121,852 A * | 6/1992 | Wilkes | 220/203.12 |
| 5,452,693 A | 9/1995 | Clark | |
| 5,531,196 A | 7/1996 | Clark | |
| 5,873,642 A * | 2/1999 | Domenig | 312/183 |
| 5,899,182 A | 5/1999 | Martinsson et al. | |
| 6,276,339 B1 * | 8/2001 | Shebert et al. | 123/470 |
| 6,474,290 B1 | 11/2002 | Coffey et al. | |
| 6,543,404 B2 | 4/2003 | Jones et al. | |
| 6,691,667 B2 | 2/2004 | Salameh | |
| 6,739,302 B2 | 5/2004 | Jones et al. | |
| 6,863,039 B2 | 3/2005 | Salameh | |
| 7,040,274 B1 | 5/2006 | Ritter et al. | |
| 7,235,286 B2 * | 6/2007 | Salameh | 428/139 |
| 2007/0234995 A1 * | 10/2007 | Jessberger et al. | 123/195 C |

* cited by examiner

*Primary Examiner*—Stephen K Cronin
*Assistant Examiner*—Anthony L Bacon
(74) *Attorney, Agent, or Firm*—Robert L. Stearns; Dickinson Wright, PLLC

(57) ABSTRACT

A engine and cover assembly therefore and method for snapping attachment of the cover to the engine without use of threaded fasteners includes a cover, a clip, and an elastomeric dampener. The clip is arranged for snapping engagement to a flange of the engine to secure the cover to the engine. The clip has a first portion extending from the cover and a rigid second portion for snapping engagement with the engine flange. The elastomeric dampener is spaced from the second portion of the clip to provide direct engagement of the second portion of the clip with the flange of the engine.

15 Claims, 6 Drawing Sheets

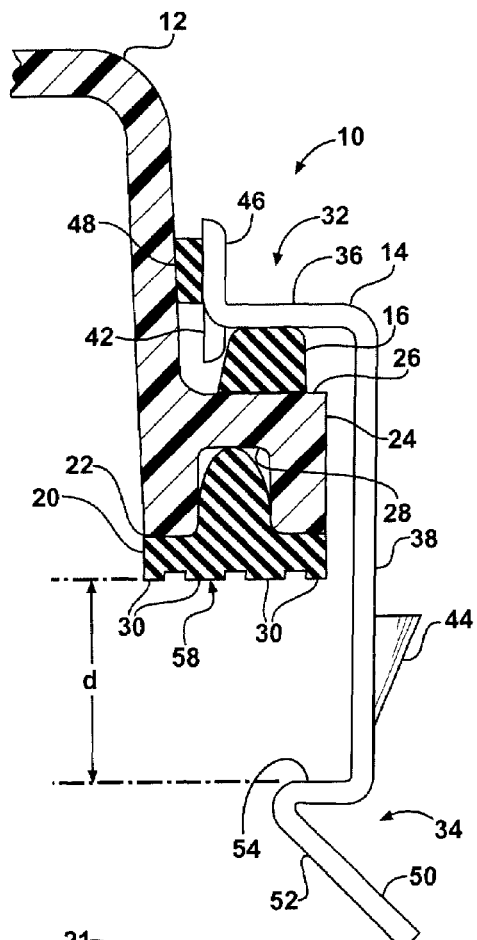
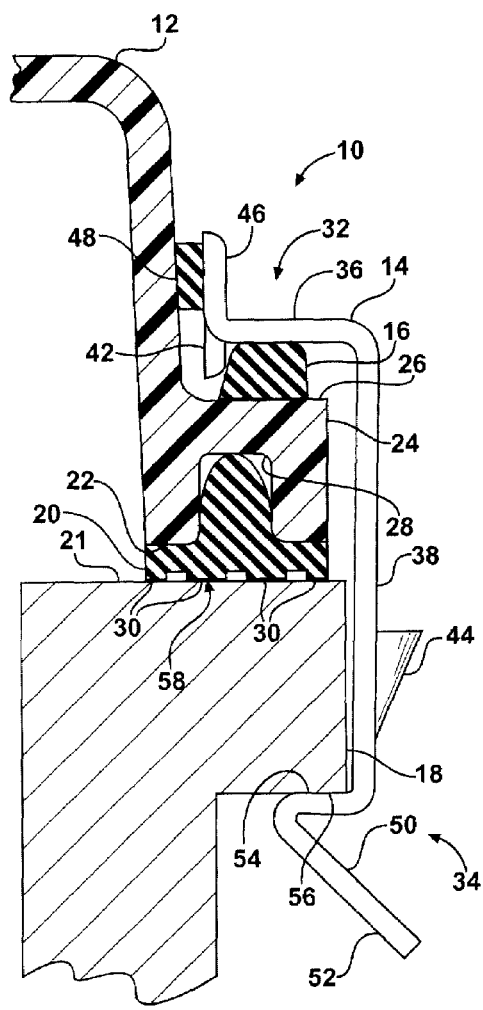

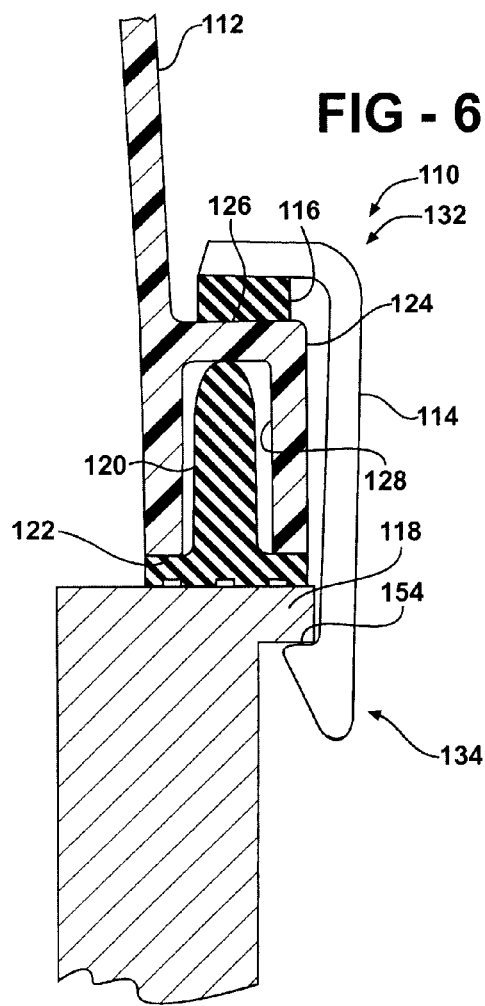
FIG - 6
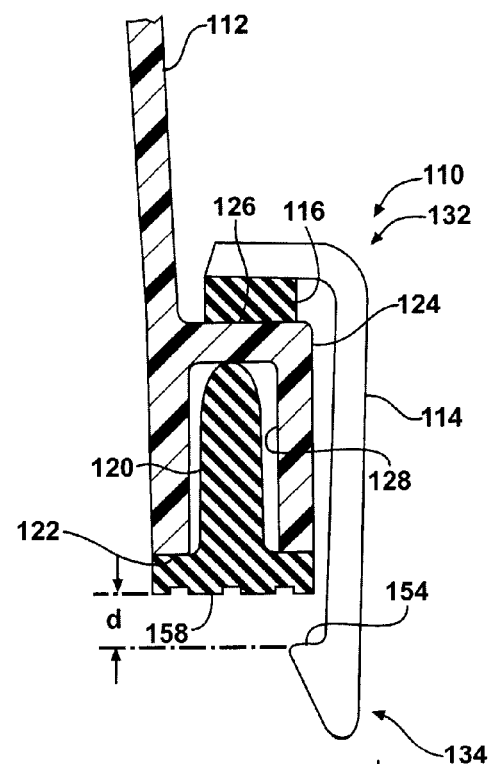
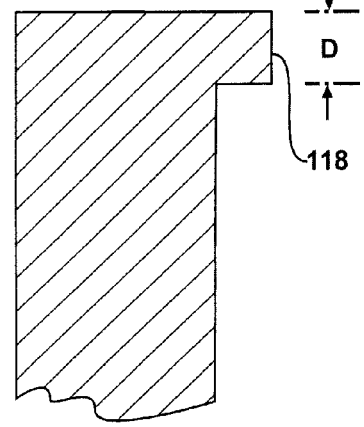
FIG - 7

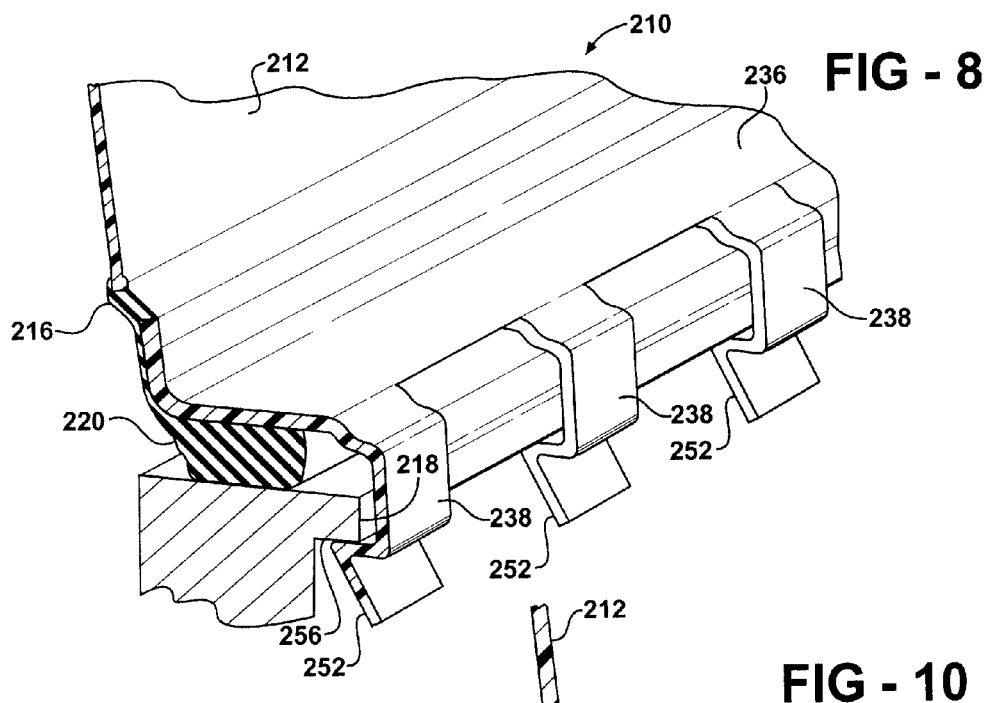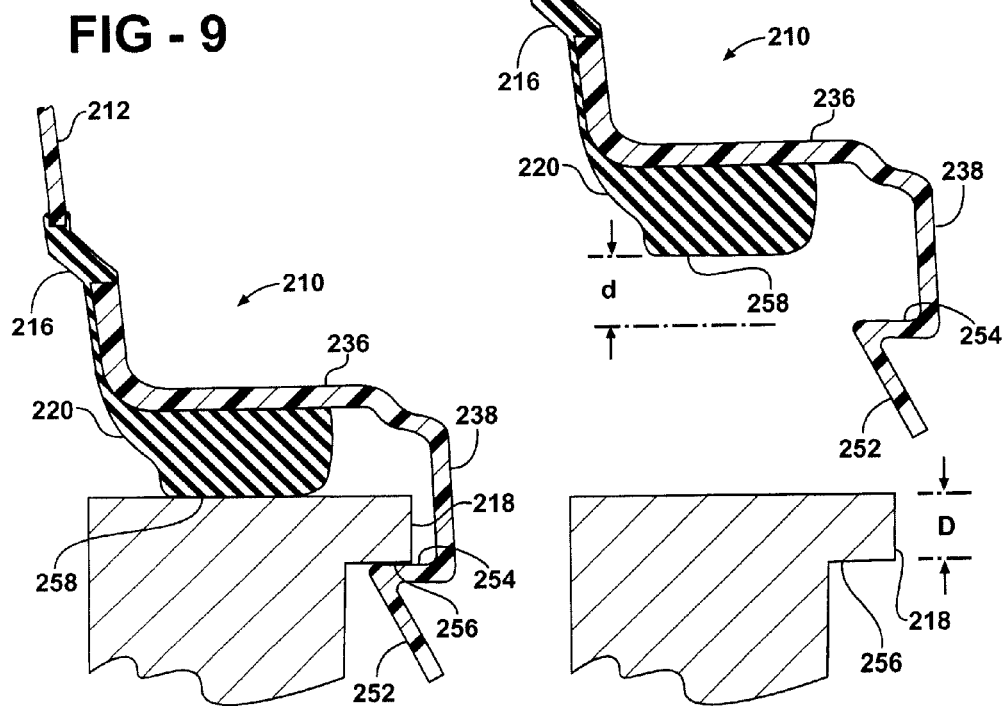

VEHICLE ENGINE AND SNAP-ON ENGINE COVER ASSEMBLY THEREFOR AND METHOD OF ASSEMBLY OF THE COVER ASSEMBLY TO THE ENGINE

BACKGROUND OF THE INVENTION

1. Technical Field

This invention relates generally vehicle engines, and more particularly to vehicle engine and covers therefor having NVH and snap-on features.

2. Related Art

Vehicle engine covers, such as valve covers, oil pan covers and front engine covers, are typically attached with bolts to the engine cylinder head and/or engine block. As such, the assembly and disassembly process for the covers can be complicated in that each bolt requires insertion and tightening to a prescribed torque range, and the removal of the bolts requires having a properly sized tool. In addition, accessing heads of the bolts with the working end of the bolt insertion/removal tool can be difficult, depending on the location of the bolts.

In addition, the use of bolts to fasten covers to the engine can provide a source for transmitting vibration, which then results in noise. As such, elastomeric washers are sometimes included to reduce the likelihood for noise generation. However, washers generally relax or deform, thereby allowing the bolts to become relatively loose, thereby resulting in leaks, vibration and noise.

SUMMARY OF THE INVENTION

A cover assembly for snapping attachment to an internal combustion engine without use of threaded fasteners has a cover, a clip, and an elastomeric dampener disposed between the clip and the cover. The clip has a first portion extending from the cover and a rigid second portion for snapping engagement with the engine. The elastomeric dampener is disposed between the clip and the cover to provide direct engagement between the second portion and the engine and to inhibit the transmission of vibration between the clip and the cover.

According to another aspect of the invention, a cover assembly for snapping attachment to an internal combustion engine without use of threaded fasteners has a cover, a clip formed as a separate piece of material from the cover. The clip has a first portion and a rigid second portion for snapping engagement with the engine. An elastomeric dampener is attached to the first portion of the clip and to the cover to inhibit the transmission of vibration between the clip and the cover.

Accordingly to another aspect of the invention, a method of attaching a cover assembly to a flange of an internal combustion engine without use of threaded fasteners is provided. The method includes providing a cover; providing a clip having a first portion and a second portion, and disposing an elastomeric dampener between the first portion of the clip and the cover in spaced relation from the second portion of the clip. Further, pressing the first portion of the clip into engagement with the dampener and snapping the second portion of the clip into locked engagement with the flange.

Accordingly to yet another aspect of the invention, an engine has a flange with a cover snapped in engagement to the flange. A clip has a first portion and a rigid second portion for snapping engagement with the flange. An elastomeric dampener is disposed between the clip and the cover to inhibit the transmission of vibration therebetween. The dampener is spaced from the second portion of the clip to provide direct engagement between the second portion and the flange.

BRIEF DESCRIPTION OF THE DRAWINGS

These and other aspects, features and advantages of a snap-on internal combustion engine cover constructed in accordance with the present invention will become more readily appreciated when considered in connection with the following detailed description of presently preferred embodiments and best mode, appended claims and accompanying drawings, in which:

FIG. 2 is a partial cross-sectional side view of the cover assembly of FIG. 1 with the cover assembly shown attached to a flange of an internal combustion engine;

FIG. 4 is a partial cross-sectional side view of the cover assembly of FIG. 1 with the cover assembly shown removed from the flange of the engine;

FIG. 6 is a partial cross-sectional side view of the cover assembly of FIG. 5;

FIG. 7 is a partial cross-sectional side view of the cover assembly of FIG. 5 with the cover assembly shown removed from the flange of the engine;

FIG. 8 is a partial perspective cross-sectional view of a cover assembly constructed in accordance with yet another presently preferred embodiment with the cover assembly shown attached to the flange of the internal combustion engine;

FIG. 9 is a partial cross-sectional side view of the cover assembly of FIG. 8;

FIG. 10 is a partial cross-sectional side view of the cover assembly of FIG. 8 with the cover assembly shown removed from the flange of the engine;

DETAILED DESCRIPTION OF PRESENTLY PREFERRED EMBODIMENTS

Figure 1:
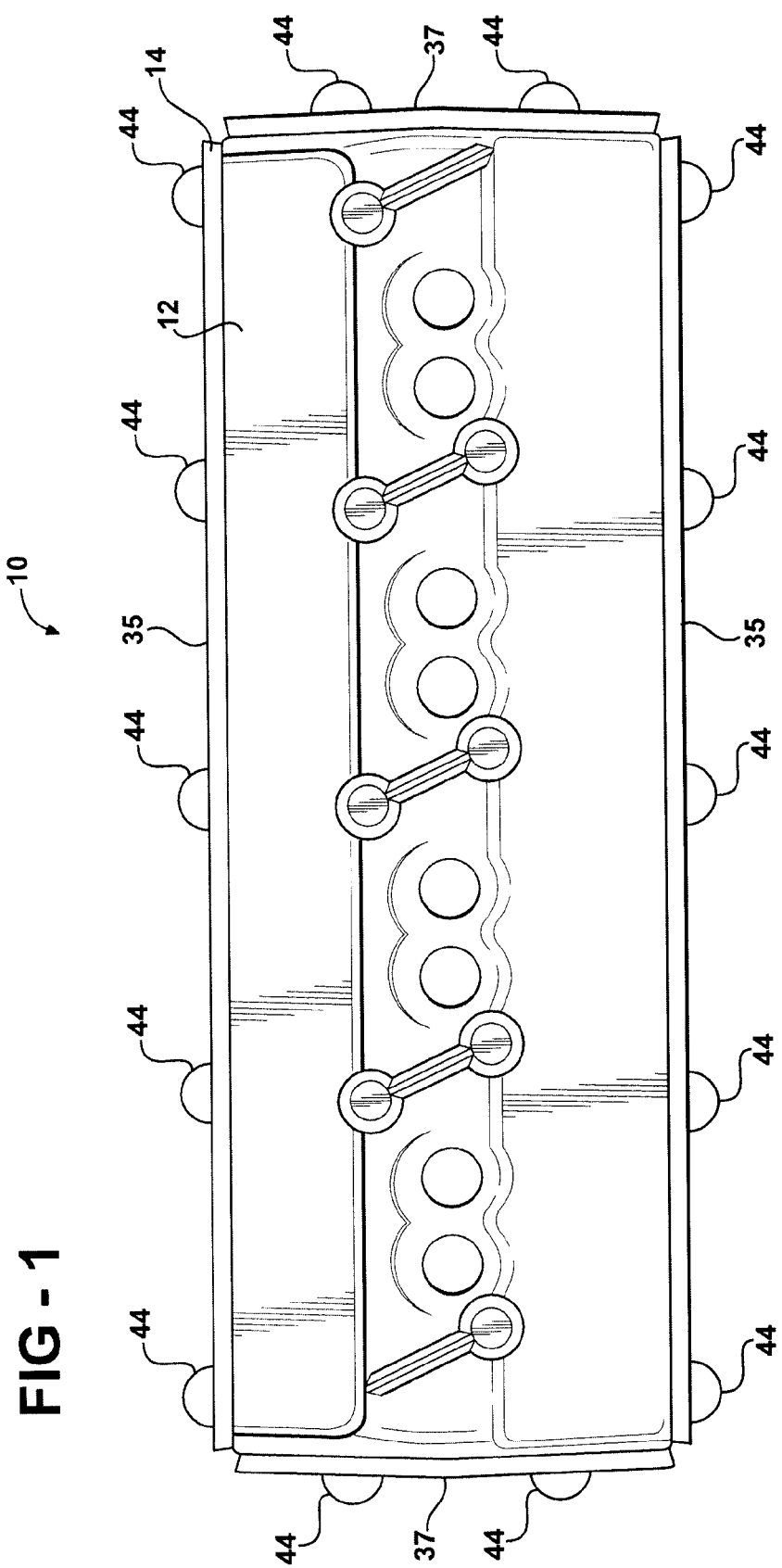
FIG. 1 is a plan view of an engine cover assembly constructed in accordance with one presently preferred embodiment.

Referring in more detail to the drawings, FIG. 1 illustrates a cover assembly 10 for an internal combustion engine constructed in accordance with one presently preferred embodiment, wherein the cover assembly can be used as a valve cover, an oil sump cover, or a rear engine cover. The cover assembly 10 includes a cover 12, a clip 14 formed of a separate piece of material from the cover 12 and an elastomeric dampener 16 disposed between the clip 14 and the cover 12 to inhibit the transmission of noise, vibration and harshness (NVH) between the clip 14 and the cover 12. The clip 14 provides a snap-on aspect to the cover assembly 10 so that the cover 12 can be readily snapped into sealing engagement with a flange 18 on the engine, such as can be present on a cylinder block and/or engine block, without requiring threaded fasteners. In addition, the clip 14 allows the cover 12 to be readily removed from the engine, such as may be necessary in service. To facilitate establishing a fluid tight seal of the cover assembly 10 with the engine, the cover assembly 10 preferably includes an elastomeric seal 20 arranged for compressed sealing engagement between the clip 14 and a surface 21 of the engine adjacent the flange 18.

The cover 12 can be fabricated from a polymeric or metallic material, as desired. The cover 12 is generally dome-shaped having a peripheral free edge 22. The peripheral free edge 22 can be formed having a flange 24 extending therefrom, shown here as being adjacent to and extending generally outwardly from the free edge 22. The flange 24 has an upper laterally extending clamp surface 26 and a channel 28 extending upwardly therein, preferably about the periphery of the flanges 24. The channel 28 is sized in width and depth to receive the elastomeric gasket or seal 20 at least partially therein. The seal 20 can be a press-in-place type seal that is preformed, or it could be a mold-in-place type, wherein the seal is molded directly into the channel 28. Regardless, the seal 20 is shown here as being formed as a separate piece of material from the dampener 16. The seal 20 extends outwardly from the channel 28, and is represented here as having a plurality of lips 30 spaced from one another and extending along the length or circumferentially about the seal 20 to facilitate forming a fluid tight seal upon being compressed against the flange 18 of the engine.

The clip 14 is formed as a separate piece of material from the cover 12, and can be formed using the same type of material or a different type of material, whether polymeric or metallic. The clip 14 has a first portion shown generally at 32 for operable attachment to the cover 12 and a generally rigid second portion shown generally at 34 for snapping engagement with the flange 18 of the engine. As best shown in FIG. 1, the clip 14 can be formed to extend substantially along an outer periphery of the cover 12, shown here, by way of example and without limitations, as extending in discrete segments along the respective sides 35 and ends 37 of the cover 14. As shown in FIG. 2, the first portion 32 of the clip 14 can have an elongate rail 36 with a plurality of fingers 38 depending therefrom to the second portion 34. The fingers 38 are represented here, by way of example, as extending generally perpendicularly to the rail 36. The fingers 38 are spaced from one another by gaps 40 of predetermined sized, depending on the number of fingers required to obtain the desired clamping force of the cover assembly 10 to the engine. The rail 36 extends generally parallel to the clamp surface 26 of the flange 24, such that the elastomeric dampener 16 can be sandwiched and compressed generally uniformly between the rail 36 and an upper surface of the flange 24. The dampener 16 can either be provided as a separate component from the rail 36 and clamp surface 26, or bonded to either one, such as via an adhesive or in a molding process, for example.

As shown in FIGS. 2 and 4, to facilitate attachment of the clip 14 to the cover 12, a plurality of tabs 42 can be formed in depending relation from the rail 36 and in spaced relation from one another for engagement with the dampener 16. In one preferred method of construction, the tabs 42 can be staked from the material of the rail 36, such as in a heat staking process or punch process, for example, depending on whether the rail 36 is polymeric or metallic.

Figure 3:
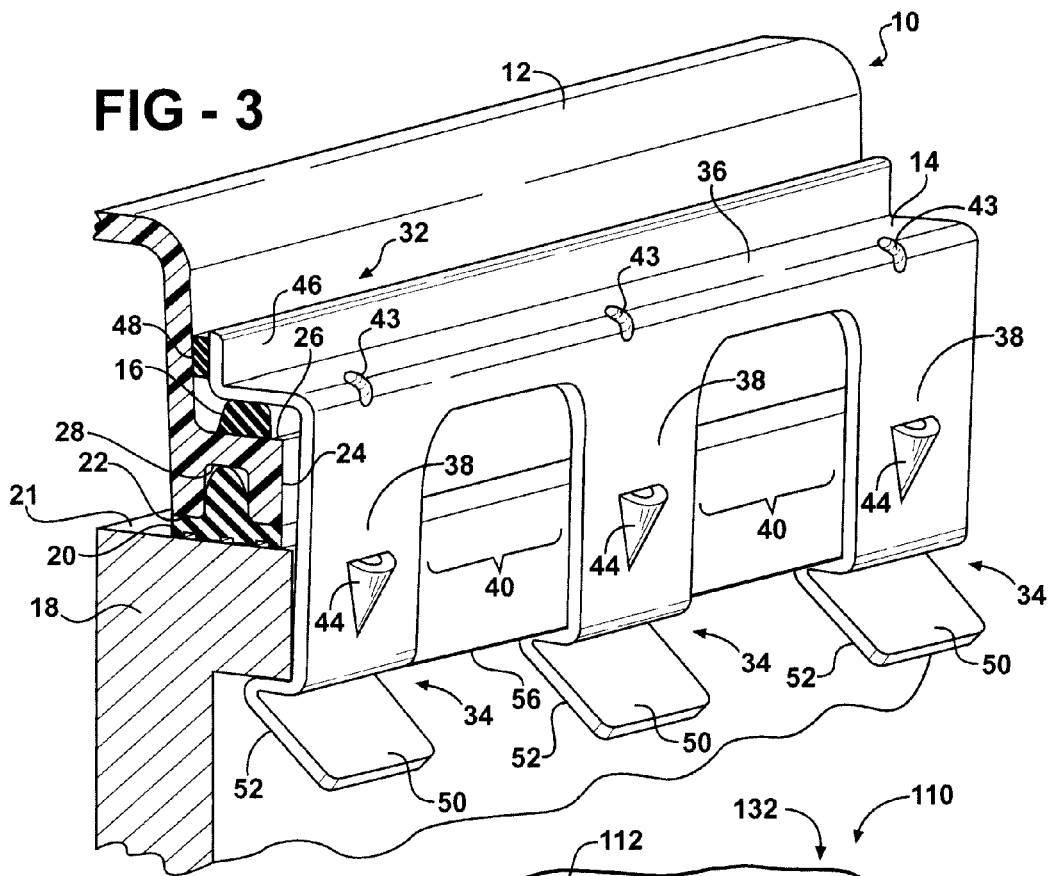
FIG. 3 is a partial perspective cross-sectional view of the cover assembly of FIG. 1.

As also shown in FIG. 3, the clip 14 can have a plurality of indentations 43 formed in a bend radius between the fingers 38 and the rail 36. The indentations 43 are preferably formed at each finger 38, though more or less could be utilized. The indentations 43 provide added strength and rigidity to the clip 12 to facilitate assembly and to maintain the desired clamping force applied by the clip 14 in use.

Further, the clip 14 can be constructed having protrusions 44 extending outwardly from at least some of the fingers 38 to facilitate assembly, particularly upon removal of the cover 12 during surface. The protrusions 44 provide a location upon which to press the clip 14 with a suitable tool (not shown) into downwardly snapping engagement with the flange 18 of the engine.

In addition, the clip 14 can have a lip 46 extending upwardly and generally perpendicular from the rail 36. The lip 46 can facilitate maintaining the clip 14 in its attached position on the cover 12 and flange 18 by limiting the degree of movement of the clip 14 relative to the cover 12. Preferably, the lip remains spaced from the cover 12 to prevent unwanted vibration and noise from being generated therebetween. As shown in FIGS. 2-4, an added NVH dampener 48 can be disposed in the space between the lip 46 and the cover 12, wherein the dampener 48 can be provided as a separate component, and thereafter adhered to either the lip 46 or the cover 12, for example, or the dampener 48 could be molded in-place on either the cover 12 or lip 46.

The fingers 38 of the clip 14 are configured to snap into locking engagement with the flange 18. Although the fingers 38 lock into place, it should be recognized that the fingers 38 can be selectively released from their locked engagement, such as during service of the components associated with the cover assembly 10, or under the cover assembly 10. To facilitate assembly and detachment of the cover assembly 10 onto and from the engine, the second portions 34, represented by ends of the clip fingers 38, can have outwardly flared extensions 50 with inclined cam surfaces 52 for camming engagement with the flange 18 on the engine. The inclined cam surfaces 52 cause the fingers 38 to be biased outwardly over the flange 18 until the surfaces 52 clear the flange 18 to bring laterally extending engagement surfaces 54 of the clip second portions 34 into locked engagement with an underlying surface 56 of the flange 18 (FIG. 3).

As shown in FIG. 4, the flange 18 has a thickness (D) and the cover assembly 10 has a thickness (d) between a bottom sealing surface 58 of the seal 20 and the engagement surfaces 54 of the fingers 38, wherein the thickness (D) is greater than the thickness (d). As such, upon pressing the cover assembly 10 downwardly onto the engine, the cam surfaces 52 engage the flange 18 and cause the fingers 38 to be biased outwardly away from the flange 18. The fingers 38 are allowed to be biased outwardly either as a result of the dampener 16 being compressed and/or the fingers 38 flexing elastically. The elastomeric dampener 16 and the elastomeric seal 20 are caused to compress a sufficient amount to allow the engagement surfaces 54 to snap into engagement with the surface 56 beneath the flange 18. Accordingly, upon the dampener 16 and/or the seal 20 being compressed, the distance (d) is increased to be substantially equal to the thickness (D) of the flange 24. As mentioned, upon the engagement surfaces 54 clearing the bottom surface 56 of the flange 18, the fingers 38 are biased or sprung back into their generally non-biased positions to bring the engagement surfaces 54 into locked engagement with the surface 56 of the flange 18, thereby preventing removal of the cover assembly 10 from the engine until commanded by an intentionally applied external force on the fingers 38.

Figure 5:
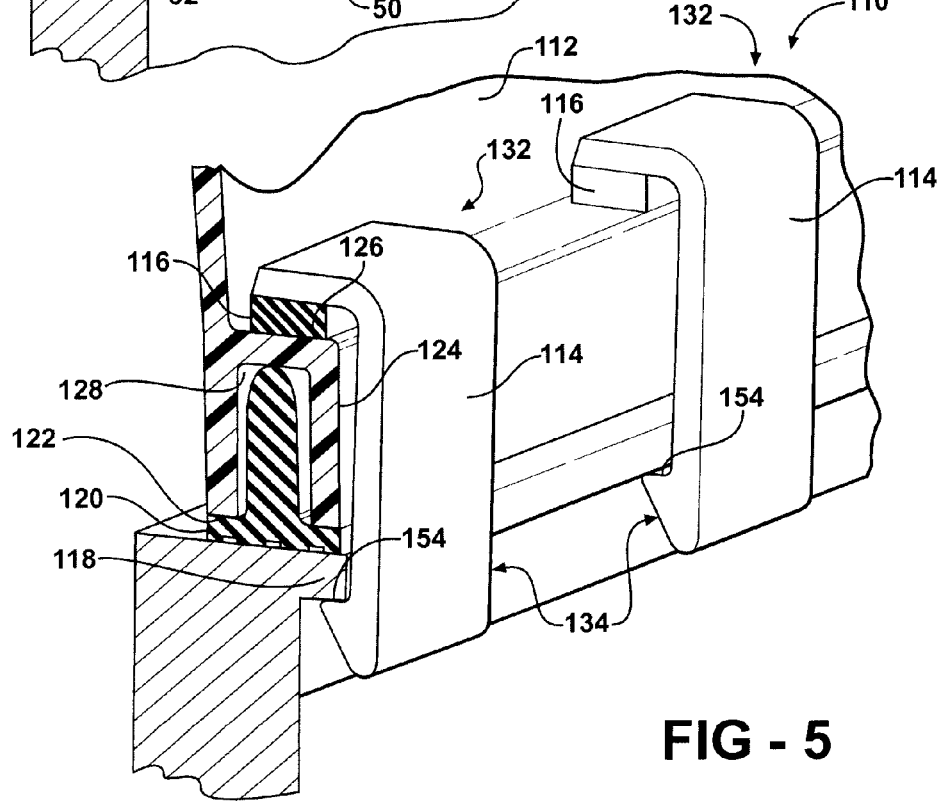
FIG. 5 is a partial perspective cross-sectional view of a cover assembly constructed in accordance with another presently preferred embodiment with the cover assembly shown attached to the flange of the internal combustion engine.

In FIG. 5, another cover assembly 110 is illustrated according to another aspect of the invention, wherein similar reference numerals to those above offset by a factor of 100 are used to identify similar features.

The assembly 110 has a cover 112 constructed generally the same as above for snapping engagement with a flange 118 of an engine. Accordingly, the cover 112 has a peripheral free edge 122, and a flange 124 with a clamp surface 126 and a channel 128 for receipt of a seal 120. In addition, the assembly 110 includes clips 114, constructed from either polymeric or metallic materials, to facilitate the snapping engagement of the cover 112 to the flange 118.

However, rather than having the rail 36 as above, the clips 114 are separate components from one another for individual snapping attachment to the cover 112 and the flange 118. The general form of the clips 114 is the same as described above for the fingers 38. As such, the clips 114 have a first portion shown generally at 132, a second portion shown generally at 134, cam surfaces 152 and engagement surfaces 154. The first portion 132 extends generally parallel to the clamp surface 126 of the flange 124, such that individual NVH elastomeric dampeners 116 can be sandwiched and compressed generally uniformly between each clip first portion 132 and the flange 124. As such, rather than a single dampener 16 as illustrated in the first embodiment, separated dampeners 16 sized to underlie the first portions 132 are incorporated here. The dampeners 116 can be either constructed and maintained as separate components from the first portions 132 and clamp surface 26, or bonded to either one, such as via an adhesive or in a molding process, for example.

As shown in FIG. 7, the engagement surfaces 154 of the clips 114 and a bottom sealing surface 158 of the seal 120 has a thickness (d), wherein the flange 118 has a thickness (D). As such, assembly of the clips 114 to the cover 112 and the flange 118 causes compression of the dampeners 116 and the seal 120, as described above, to snappingly maintain the cover 112 in sealed engagement with the flange 118 of the engine. Otherwise, the cover assembly 110 is generally the same as described above, and thus, no further detailed description is believed necessary for understanding of this embodiment.

In FIG. 8, another cover assembly 210 is illustrated according to another aspect of the invention, wherein similar reference numerals to those used in the first embodiment offset by a factor of 200 are used to identify similar features.

The assembly 210 has a cover 212 and a rail 236 constructed for snapping engagement with a flange 218 of an engine. The cover 212 and the rail 236 are formed from separate pieces of material, wherein the material content can be the same or different, depending on the application. For example, the cover 212 and rail 236 can be constructed from a metallic and/or polymeric material. The cover 212 and rail 236 are attached to one another by an NVH elastomeric dampener, referred to hereafter as a NVH bridge 216. The NVH bridge 216 can encapsulate outer peripheries of the cover 212 and rail 236 such that the cover 212 and rail 236 are maintained in spaced relation from one another about their outer peripheries.

The rail 236 has a plurality of fingers 238 depending therefrom, with the fingers 238 being spaced from and separate from one another for individual snapping attachment to the flange 218. The general form of the fingers 238 is similar as described above for the fingers 38. As such, the fingers 238 have cam surfaces 252 and engagement surfaces 254 for snapping engagement with surfaces 256 beneath the flange 218.

The cover assembly 210 also includes a seal 220 for establishing a fluid tight seal between the assembly and the flange 218. The seal 220 can be provided as a separate piece of material from the NVH bridge 216, or as illustrated, as a single piece material with the NVH bridge 216. Accordingly, the seal 220 is molded to a bottom surface of the rail 236 during the molding of the NVH bridge 216. It should be recognized that the NVH bridge 216 and the seal 220 can be molded using the same elastomeric materials, such as rubber or silicone, for example, or they could be molded in detached relation from one another and from dissimilar materials, if desired.

As shown in FIG. 10, the engagement surfaces 254 of the fingers 238 and a bottom sealing surface 258 of the seal 220 has a thickness (d), wherein the flange 218 has a thickness (D). As such, snapping engagement of the fingers 238 with the flange 218 causes compression of the seal 220, as described above, to maintain the cover assembly 210 in sealed engagement with the flange 218 of the engine.

Figure 11:
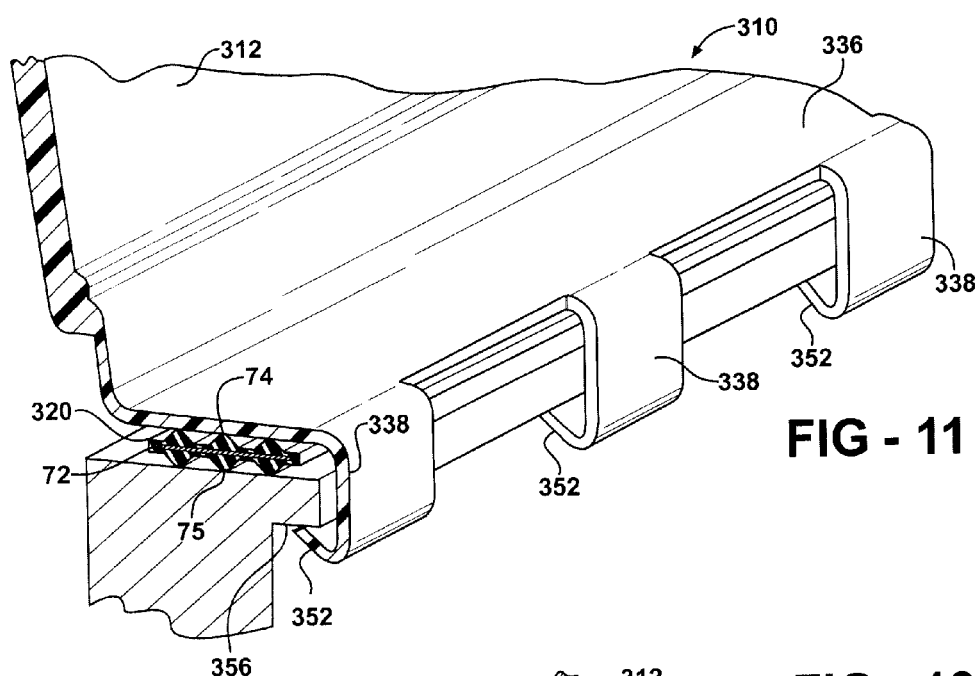
FIG. 11 is a partial perspective cross-sectional view of a cover assembly constructed in accordance with yet another presently preferred embodiment with the cover assembly shown attached to the flange of the internal combustion engine.
Figure 12:
FIG. 12 is a partial cross-sectional side view of the cover assembly of FIG. 11.

In FIG. 11, another cover assembly 310 is illustrated according to another aspect of the invention, wherein similar reference numerals to those used in the first embodiment offset by a factor of 300 are used to identify similar features.

The assembly 310 has a cover 312 and a rail 336 constructed for snapping engagement with a flange 318 of an engine. The cover 312 and the rail 336 are formed from separate pieces of material, wherein the materials used to form the cover 312 and rail 336 can be the same or different, depending on the application. For example, the cover 312 and rail 336 can be constructed from either metallic and/or polymeric materials. The cover 312 and rail 336 are attached to one another in a casting or molding process. In one presently preferred embodiment, the rail 336 can be formed from metal, such as a stamped steel, for example, and the cover 312 can be molded from a plastic material to a free edge of the rail 336. It should be recognized that an NVH bridge (not shown), such as that shown in FIG. 7, for example, could be molded to connect the cover 312 to the rail 336.

The rail 336 has a plurality of fingers 338 depending therefrom, with the fingers 338 being spaced from and separate from one another for individual snapping attachment to the flange 318. The fingers 338 have cam surfaces 352 extending upwardly and inwardly to facilitate biasing the fingers 338 outwardly over the flange 318 until free ends forming engagement surfaces 354 of the fingers 338 clear the flange 318 and move into snapping engagement with surfaces 356 beneath the flange 318.

The cover assembly 310 includes a seal 320 for establishing a fluid tight seal between the rail 336 and the flange 318. The seal 320 is represented here as a separately formed member from the cover 312. The seal 320 is shown as having a carrier 72 formed from a separate material than the material of the seal 320, such as nylon or metal, for example. The material forming the seal 320 can be formed in a liquid elastomer molding process using a quick curing elastomer, such as silicone, for example. The seal 320 is represented, by way of example and without limitations, as having undulating upper and lower surfaces 74, 75 to facilitate forming a liquid tight seal between the rail 336 and the flange 324.

Figure 13:
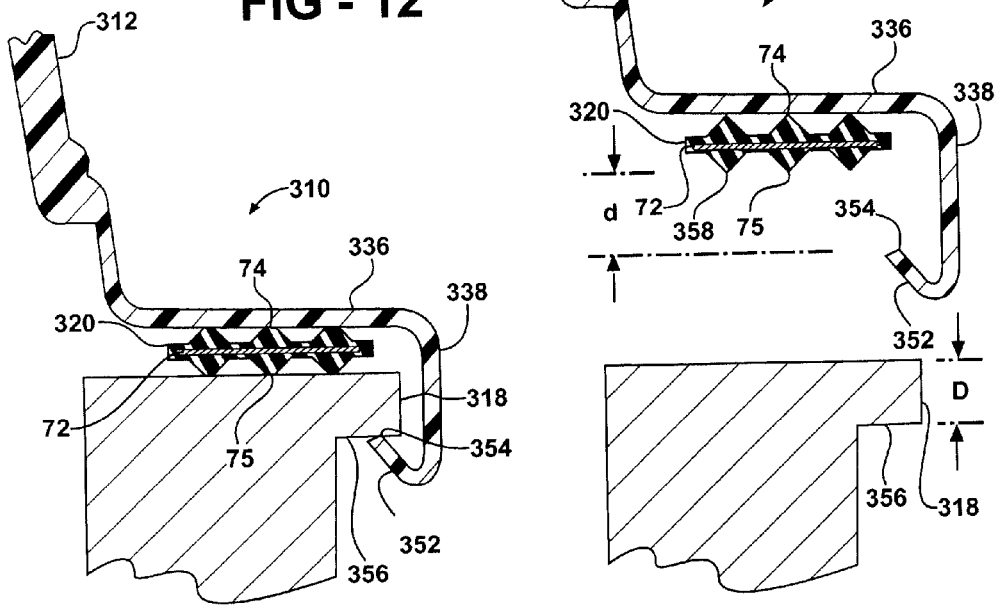
FIG. 13 is a partial cross-sectional side view of the cover assembly of FIG. 11 with the cover assembly shown removed from the flange of the engine.

As shown in FIG. 13, the engagement surfaces 354 of the fingers 338 and a bottom sealing surface 358 of the seal 320 has a thickness (d), wherein the flange 318 has a thickness (D). As such, snapping engagement of the fingers 338 with the flange 318 causes compression of the seal 320, as described above, to maintain the cover assembly 310 in sealed engagement with the flange 318 of the engine.

Obviously, many modifications and variations of the present invention are possible in light of the above teachings.

It is, therefore, to be understood that within the scope of the appended claims, the invention may be practiced otherwise than as specifically described.

What is claimed is:

1. A cover assembly for attachment to an internal combustion engine without use of threaded fasteners, comprising:
   a cover;
   a clip formed as a separate piece of material from said cover, said clip having a first portion extending from said cover and a rigid second portion for snapping engagement with the engine;
   at least one elastomeric dampener disposed between said clip and said cover to inhibit the transmission of vibration therebetween, said dampener being spaced from said second portion to provide direct engagement between said second portion and the engine;
   said cover has an outwardly extending flange arranged to support said first portion of said clip;
   an elastomeric seal separate from said elastic dampener, said flange having a peripheral channel extending upwardly therein, said elastomeric seal being disposed partially in said channel and extending outwardly therefrom to provide sealing engagement with the engine; and
   wherein said first portion of said clip provides an elongate rail with at least one tab depending from said rail for engagement with said elastomeric dampener.

2. The cover assembly of claim 1 wherein said at least one elastomeric dampener includes a pair of elastomeric dampeners, one of said pair of elastomeric dampeners is attached to said flange of said cover and another of said pair of elastomeric dampeners is attached to said first portion of said clip.

3. The cover assembly of claim 2 wherein a plurality of fingers depend from said rail to said second portion in spaced relation from one another.

4. The cover assembly of claim 3 wherein at least one of said pair of elastomeric dampeners is bonded to at least one of said rail or said flange.

5. The cover assembly of claim 3 wherein said second portion includes an engagement surface extending substantially parallel to said rail for direct engagement with the engine.

6. The cover assembly of claim 1 wherein said second portion has an inclined cam surface for camming engagement with the engine.

7. A method of attaching a cover assembly to a flange of an internal combustion engine without use of threaded fasteners, said method comprising:
   providing a cover with an outwardly extending flange having a peripheral channel extending upwardly therein;
   disposing an elastomeric seal in the channel;
   providing a clip as a separate piece of material from the cover having a first portion and a second portion extending away from said cover wherein said first portion of said clip is provided as an elongate rail with at least one tab depending from said rail;
   disposing an elastomeric dampener separate from the elastomeric seal between said first portion of said clip and said cover in spaced relation from said second portion of said clip; and
   bringing the elastomeric seal into sealing engagement with the flange of the engine by pressing said first portion of said clip into engagement with said dampener and engaging said dampener with said at least one tab to maintain the first portion of the clip in overlying relation with the flange of the cover while snapping said second portion of said clip into locked engagement with said flange of the engine.

8. The method of claim 7 further including providing a plurality of fingers depending from the rail to said second portion in spaced relation from one another.

9. The method of claim 8 further including forming a plurality of tabs depending from said rail for engagement with said elastomeric dampener.

10. The method of claim 7 further including attaching said elastomeric dampener to said flange of said cover and said first portion of said clip.

11. The method of claim 10 further including molding said elastomeric dampener to said flange of said cover and said first portion of said clip.

12. An engine, comprising:
   a flange extending from a portion of the engine;
   a cover;
   a clip formed of a separate piece of material from said cover having a first portion extending from said cover and a rigid second portion for snapping engagement with said flange;
   an elastomeric dampener disposed between said clip and said cover to inhibit the transmission of vibration therebetween, said dampener being spaced from said second portion to provide direct engagement between said second portion and said flange;
   said cover having an outwardly extending flange arranged to support said first portion of said clip;
   an elastomeric seal separate from said elastic dampener, said flange of said cover having a peripheral channel extending upwardly therein, said elastomeric seal being disposed partially in said channel and extending outwardly therefrom to provide sealing engagement with said flange of the engine; and
   wherein said first portion of said clip provides an elongate rail with at least one tab depending from said rail for engagement with said elastomeric dampener to maintain the first portion of the clip in overlying relation with the flange.

13. The engine of claim 12 wherein a plurality of fingers depend from said rail to said second portion in spaced relation from one another.

14. The engine of claim 13 wherein said elastomeric dampener is bonded to at least one of said rail or said cover flange.

15. The engine of claim 12 wherein said second portion has an inclined cam surface for camming engagement with said flange of the engine.

* * * * *